Patented Mar. 30, 1943

2,315,111

UNITED STATES PATENT OFFICE 2,315,111

METHOD OF DETECTING ALTERATIONS OF DOCUMENTS

Josef Ehrlich, Vienna, Germany; vested in the Alien Property Custodian

No Drawing. Original application August 12, 1935, Serial No. 35,890. Divided and this application June 15, 1938, Serial No. 213,843. In Hungary August 26, 1933

3 Claims. (Cl. 23—230)

For detecting alterations of documents by erasures, additions and the like, various methods are employed all of which require considerable skill in the particular treatment to which the documents are subjected as well as in the interpretation of the obtained results.

The present invention relates to a method of rapidly detecting alterations of documents or scripts by rendering visible alterations or differences in the fibre structure of paper without damage to the paper consisting in discolouring the paper by coating it with a liquid containing free iodine and at least two mineral salts of which at least one is highly water soluble and present in high concentration and subsequently removing the discolouration by a coating of a concentrated solution of a mineral salt which enters into chemical reaction with iodine to form colourless compounds.

Such a method will reveal most of the existing alterations in a manner which allows the result to be readily interpreted without any particular experience or skill.

Articles such as bank notes, stamps of various kinds, passports, securities, cheques, savings bank books, letters, account books, invoices and other documents, are frequently subjected to alterations, fraudulent or otherwise, and the invention provides a method for rapidly revealing such alterations without calling for the aid of an expert.

Experiments have shown that alterations in the paper material in the form of creases, expansion, swelling, displacement or mechanical reduction, will produce different shades of colour on the paper under treatment. An obliteration, whether mechanical or chemical will be revealed as well as attempts made to conceal the obliterations. Alterations in the paper material will be visible not only on the front but also at the back of the paper. Mechanical erasures in particular can be readily detected and the erased matter again rendered visible by treating the back of the document.

By the method of the invention a discolouration is produced on affected places which is clear and sharp and which will last long enough for a proper examination of the alteration. The treatment does not in any way interfere with other, more elaborate invenstigations by means of photography, quartz lamps or the like which may subsequently be found necessary.

In order to prevent the bleaching out of easily soluble printing or other matter from cheques and the like, the solution is preferably highly concentrated as regards mineral salts. The more concentrated the solution the more clearly the paper alterations will be shown, the longer they will last, and the less will the treatment be affected by other influences such as finger marks or the like, and the best results will be obtained from a saturated solution. Moreover, the greater the salt contents of the solution the less likely it is to injure the surface of the document under treatment. It is therefore advantageous to use easily soluble mineral salts, i. e., salts which will dissolve in large quantities in the liquid. As suitable salts may be mentioned magnesium chloride which has a saturation degree of 365 parts by weight to 100 parts of cold water and 558 parts to 100 parts of warm water. Another suitable salt is calcium chloride which has a saturation degree of 400 parts to 100 parts of cold and 650 parts to 100 parts of warm water. For the same reason calcium iodide, calcium iodate, lithium chloride, lithium chlorate, aluminium chloride and others are also suitable. Zinc chloride is however not suitable since it damages the paper structure and is also fluorescent in ultra violet light. As a nonhygroscopic salt use may be made of zinc sulphate and glycerine may be mentioned as an example of a suitable hygroscopic, nonmineral substance which may be used. The presence of hygroscopic substances is advantageous but not absolutely necessary. Said designated substances, namely, calcium chloride, calcium iodate, lithium chloride, lithium chlorate, aluminum chloride, zinc sulphate, and others of the same general class, to which the paper is inert, are equivalents for magnesium chloride.

The colour obtained by the treatment depends on the nature of the salt employed and may be of different shades from blue to brown and red to yellow. This is of great importance since it is possible to adjust the colour so that the document will be suitable for a subsequent photographic test. The best results are obtained by the use of magnesium chloride possibly because many subsidiary ingredients in paper will combine with this salt to form traces of colloidal magnesium hydroxide which has a great affinity for free iodine.

The free halogen may be incorporated in a solution in the following manner: A solution of potassium or sodium iodide is mixed with a solution of mineral salts, and a few drops of bromine are added. As an example of an easily dissociated halogen solution the Pregl iodine solution may be mentioned. In 10 parts by weight of this solution 30 parts magnesium chloride are dissolved, and a little potassium iodide is added. After standing for a time, the solution assumes a yellowish brown colour.

The use of a highly concentrated solution for the detection of alterations in the paper surface, has led to the further use of the solution for determining whether anything has been added to an original piece of writing. Thus, an iodine and potassium iodide solution highly concentrated with mineral salts and applied to a document containing matter written down at different times, will after a few minutes cause the later writing to be darker than the earlier one.

For the removal of the marks left by a test, after the application of the halogen solution the tested document is treated with a substance adapted to remove the discolourations. For this purpose a concentrated solution of sodium thiosulphate of not less than 20% and preferably 30%-70% strength may be used. When the halogen consists of iodine and is dissolved in an aqueous solution of potassium iodide it is advantageous to use from 20 to 40 times as much potassium iodide as free iodine.

The test may be carried out as follows:

The document to be treated is first coated with the halogen solution and then treated with a dry brush, a piece of cotton wool or the like, for the removal therefrom of superfluous liquid. After the presence or absence of alteration has been determined, the testing solution is removed by treatment with a sodium thiosulphate solution whereupon the document is blotted and carefully dried. Previous to the blotting and drying the document may be washed in water. Instead of the thiosulphate, sodium sulphite or any other substance which reacts with a halogen, may be employed. The discolouration may also be removed by blotting it with blotting paper impregnated with a solution of a thiosulphate.

As an example, to make a satisfactory testing solution, 200 grammes of magnesium chloride are dissolved in 100 cubic cms. of water. To this solution 40 g. potassium iodide, dissolved in 40 cubic cms. of water containing 0.15 g. iodine, are added.

To make a suitable clearing solution 60 g. sodium thiosulphate are dissolved in 100 cubic cms. of water.

Instead of the thiosulphate potassium, ammonium or sodium sulphite may be used.

If it is suspected that part of a document has been erased or chemically obliterated and it is desired that the obliterated writing be permanently restored, the region where the obliteration is suspected is, after treatment with the testing and clearing solutions have shown the presence of an obliteration, dabbed first with dilute hydrochloric acid, then with a solution of potassium ferrocyanide and subsequently again with hydrochloric acid. Ammonium hydrosulphide may be used instead of ferrocyanide without treatment with hydrochloric acid. The obliterated writing may also be rendered visible by treating the back of the document with the testing solution only. The effect can then be subsequently removed when desired by treating the back with the clearing solution. This method is suitable only for erased pencil, typed or printed matter while the ferrocyanide or hydrosulphide treatment which is effected on the front face of the document is intended for inked writing. The salts used in the solutions must be optically neutral, i. e. they must not, like zinc chloride and other zinc salts, fluoresce in ultra violet light.

This application is a division of my application Serial No. 35,890, filed on August 12, 1935 on which U. S. Patent No. 2,123,597 has been issued on July 12, 1938.

I claim:

1. A method of rapidly detecting alterations of documents or scripts by rendering visible alterations or differences in the fibre structure of paper, without damage to the paper, consisting in discoloring the paper by treating it with an aqueous solution which contains free iodine, a dissolved iodide and magnesium chloride, the solution of magnesium chloride in said aqueous solution being substantially saturated, and subsequently removing the discoloration by treating the paper with a concentrated solution of a mineral salt which enters into chemical reaction with iodine to form colorless compounds.

2. A method of rapidly detecting alterations of documents or scripts by rendering visible alterations or differences in the fibre structure of paper, without damage to the paper, consisting in discoloring the paper by treating it with an aqueous solution which contains iodine and which also contains iodides, said solution being saturated with dissolved magnesium chloride, and subsequently removing the discoloration by treating the paper with a concentrated solution of a mineral salt which enters into chemical reaction with iodine to form colorless compounds.

3. Method of rapidly detecting alterations of documents consisting in applying to the surface to be investigated a solution containing about 200 parts by weight of magnesium chloride, 40 parts alkali iodide, 0.15 part of iodine and 140 parts water, drying said surface and subsequently applying a concentrated solution of sodium thiosulphate.

JOSEF EHRLICH.